(12) United States Patent
Tran

(10) Patent No.: US 6,409,137 B1
(45) Date of Patent: Jun. 25, 2002

(54) ARTICULATED CUP TRAY

(76) Inventor: Yen Tran, 1100 N. Priest Dr. #1093, Chandler, AZ (US) 85226

( * ) Notice: Subject to any disclaimer, the term of this patent is extended or adjusted under 35 U.S.C. 154(b) by 0 days.

(21) Appl. No.: 09/670,830

(22) Filed: Sep. 28, 2000

Related U.S. Application Data
(60) Provisional application No. 60/163,440, filed on Nov. 4, 1999.

(51) Int. Cl.⁷ .................................................. A47K 1/08
(52) U.S. Cl. ..................................... 248/311.2; 206/549
(58) Field of Search .............................. 248/311.2, 308, 248/291.1, 601; 206/549

(56) References Cited

U.S. PATENT DOCUMENTS

| | | | | |
|---|---|---|---|---|
| 4,887,784 A | * | 12/1989 | Kayali | ..................... 248/311.2 |
| 4,943,025 A | * | 7/1990 | Warner | ................. 248/311.2 X |
| 5,833,194 A | * | 11/1998 | Jones et al. | .............. 248/311.2 |
| 5,853,158 A | * | 12/1998 | Riggle | ...................... 248/311.2 |
| 6,045,017 A | * | 4/2000 | Connell | ............... 248/311.2 X |

FOREIGN PATENT DOCUMENTS

JP 17269 A * 1/2001

\* cited by examiner

*Primary Examiner*—Ramon O. Ramirez
(74) *Attorney, Agent, or Firm*—Roger A. Marrs

(57) ABSTRACT

A food or beverage holder for seatback tray includes a food or beverage portion having a platform with an open recess for receiving a container such as a cup, glass or can. A universal joint may mount the portions together for folding or storage. The platform includes a hook or an adjustable grip for engaging with the edge of a seatback mounted tray or an armrest.

4 Claims, 2 Drawing Sheets

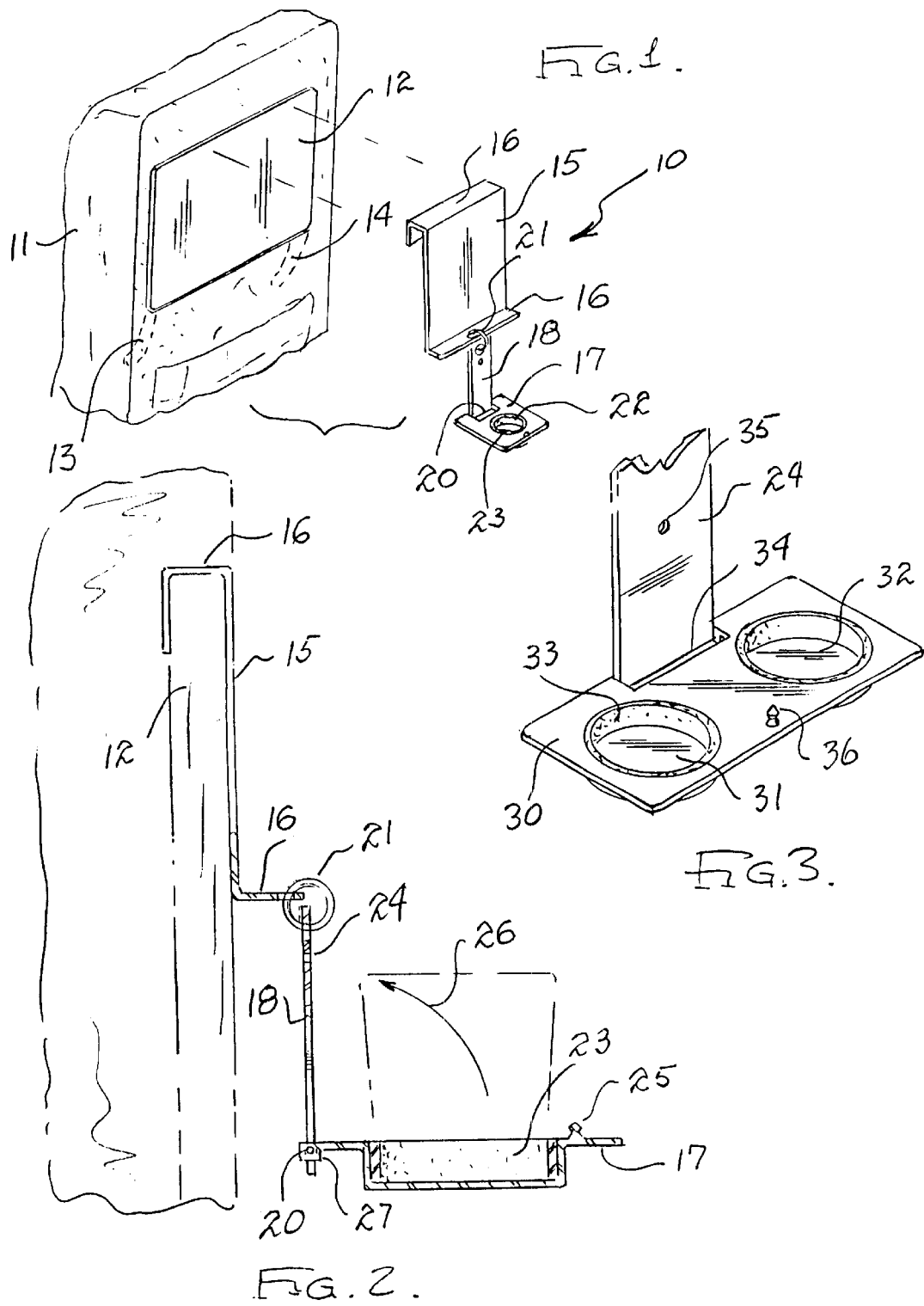

ARTICULATED CUP TRAY

Priority Claimed on Ser. No. 60-163,440 filed Nov. 4, 1999

BACKGROUND OF THE INVENTION

1. Field of the Invention

The present invention relates to the field of support trays, and more particularly to a novel tray having an articulated portion downwardly depending from a stabilizing portion for removably supporting drinking vessels, such as cups, glasses, beverage cans or the like.

2. Brief Description of the Prior Art

In the past, it has been the conventional practice to provide a tray which may be supported from a structure so that drinking containers, when placed on the tray, can be properly supported. However, problems and difficulties are encountered when the tray on which the drinking container or vessel is supported is not convenient. For example, difficulties and problems have been encountered when employing trays on the back of airline seats which generally occur when the tray has been deployed into a serving position for holding drinks, food or the like, and the person sitting in the seat activates the seat into a different position. Such activation causes the seatback to spring either forward or rearward so that any food or drink which is on the deployed tray will spill. In instances where hot beverage is involved, serious injury may occur to the person sitting behind the moved seatback. Also, in other instances when seated personnel in a row of seats move from the seat into the aisle, trays must be moved to their stored or stowed position on the seatback which necessitates that beverages by held in the hand of the person. Such a procedure is dangerous in the event that an airplane should encounter turbulence or any sort of uneven flight.

In addition to the above, passengers experience great inconvenience because there is a lack of space to accommodate crossed legs, leg movement and the like. Lowering of the seat tray further reduces leg room and mobility.

In view of the foregoing, a long-standing need has existed to provide an articulated beverage holder that may be supported on the seatback of an airline seat and which will not have a tendency to spill or become upset during a seat-back moving procedure. Also, such a holder can be placed on a raised tray so that ample space is available for leg or body movement. Such a beverage holder may include a universal type joint or gimbal that remains relatively level for supporting a beverage while the seatback is moved from one position to another.

SUMMARY OF THE INVENTION

Accordingly, the above problems and difficulties are avoided by the present invention which provides a novel beverage holder which includes a stabilizing portion and a beverage support portion that downwardly depends from the stationary portion. The beverage portion constitutes a platform having an open recess for receiving the bottom of a beverage container, such as a cup, glass or can. A universal joint means, such as a link or a hinge, movably joins the support platform to the stabilizing portion so that the platform portion can be folded against the stabilizing portion for storage purposes. The stabilizing portion includes an upper end having an integral hook so that the stabilizing portion can be removably hooked over the edge of a folded food tray that is normally carried on the back of the seat of an airline seat. Latch means are provided for detachably connecting the platform portion to the stabilizing portion so that a folded condition exists when not in use. When unlatched, the platform portion further includes a stop means whereby the platform is maintained in a normal or perpendicular position with respect to the stabilizing portion.

The platform may include a single recess or a double recess and the universal joint means may take the form of one or more links or may take the form of an elongated hinge.

In another embodiment, a pair of support platform portions can be pivotally joined together for horizontal movement with respect to one another whereby the support platforms provide a pair that may be folded together for storage purposes or may be deployed in a side-by-side arrangement wherein two beverage containers can be supported simultaneously. In such a configuration, a finger clamp may be carried on one of the support portions so that the pair of support portions can be detachably connected to the side of a tray or other support member.

Therefore, it is among the primary objects of the present invention to provide a novel beverage tray that may accommodate one or more beverage cans and which may be supported from the seatback tray of a conventional airline seat so that the beverage container tray does not occupy two much space even when the airline seatback is moved.

Another object of the present invention is to provide a novel articulated beverage or cup tray which includes a universal joint means for supporting a support platform so that maximum leg room is available.

Another object resides in providing a beverage support means which includes a platform carried by links or hinge means from a stabilizing means whereby at least one or more beverage cans or containers will be supported.

Still a further object resides in providing a support platform for a beverage container that not only is articulated for movement but which includes gripping means for releasably holding the containers in place on the support platform.

The inventive device further includes adjustment means for properly fitting a support for a cup holder onto the edge of a tray so as to accommodate varying tray width.

Also, the inventive device contemplates at least one and multiples thereof of container receptacles or recesses for use singularly or in tandem.

Another primary object is to provide convenience to a passenger by installing a cup holder on a raised tray in its storage position on a seat back thereby providing increased leg and body space.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the novel articulated beverage or cup tray incorporating the present invention;

FIG. 2 is an enlarged side elevational view, partly broken away, of the beverage or cup tray shown in FIG. 1 and illustrated as being supported from an airline seat tray;

FIG. 3 is a front perspective view of another embodiment of the invention illustrating an arrangement for supporting more than one beverage container;

DESCRIPTION OF THE PREFERRED EMBODIMENT

Figure 4:
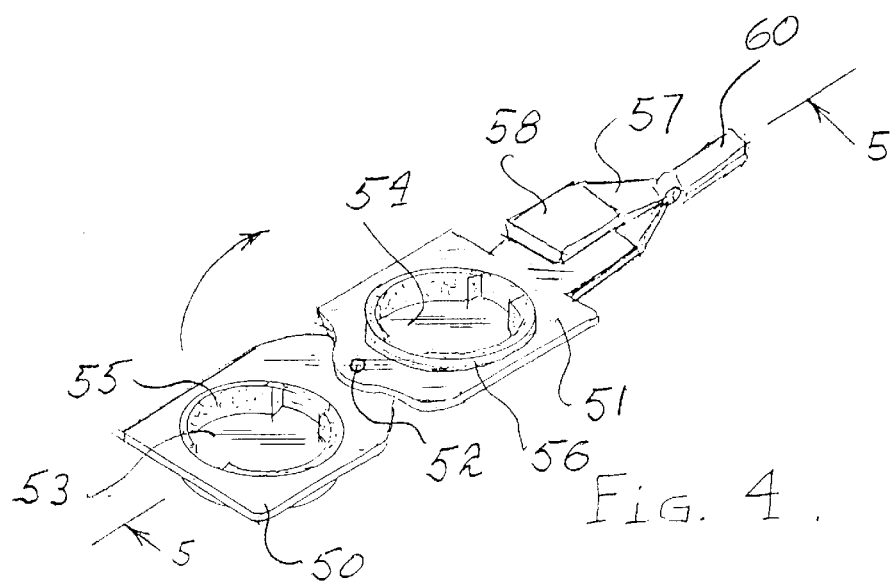
FIG. 4 is a front perspective view of another embodiment of the present invention showing a clip means for releasably supporting a pair of trays onto other supporting structure.

Referring to FIG. 1, the novel beverage or cup tray is illustrated in the general direction of arrow 10 and the tray is illustrated in connection with usage with an airline seatback 11 which is provided with a conventional tray 12 adapted to be deployed from a recess in the seatback by means of pivoting levers 13 and 14.

With respect to the beverage or cup tray 10, a flat stabilizing portion 15 includes a hook 16 at one end that is adapted to be placed over the edge of tray 12 while the tray is in the stowed position in its recess on the back of the seatback 11. The opposite end of the stabilizing means 15 is provided with a ledge 16 from which a support platform 17 downwardly depends via a piece 18. The piece 18 includes a hinge 20 that is carried on the edge marginal region of the support platform 17 and its opposite end is movably connected to the ledge 16 by means of a universal type joint such as a link 21.

The support platform 17 includes a recess 22 for holding the bottom of a beverage container, such as a cup, glass or can. A feature resides in providing the recess with a deformable or cushion-type material, such as a sponge or foam which operates to grip the bottom of the beverage container and which offers slight resistance to removal of the container. Such a gripping means is indicated by numeral 23.

Referring now in detail to FIG. 2, it can be seen that the stabilizing means 15 is a flat plate-like structure and that the hook 16 suitably fits over the top of the edge of tray 12 so that the beverage tray is downwardly supported therefrom. The ledge 16 outwardly projects from the flat surface of the plate 15 and the link 21 which may take the form of one or more wing-like connectors movably coupling the ledge 16 to the top end of piece 18. It is to be particularly noted that the piece 18 includes a notch 24 for insertably receiving a latch 25 which is carried on the platform 17. When the support platform 17 is pivoted on its hinge 20, the pin 25 enters the recess or opening 24 to effect a detachable connection so that the support platform 17 is in a closed or non-use condition for storage. Such a condition permits the unit to be carried in a purse and the closed platform against piece 18 may be further articulated about the universal joint 21 to rest against the flat plate 15. Therefore, it can be seen that a compact storage arrangement is provided so that the: unit may be carried by an individual from place to place with convenience.

Arrow 26 indicates the direction and movement of the support platform 17 from the solid line position to the closed position when the latch 25 is engaged with the opening 24. Also, it can be seen that the platform further includes a stop 27 which engages with a leg on the piece 24 so that when fully deployed, the support platform 17 outwardly extends from piece 24 at a right angle or normal thereto.

Referring now in detail to FIG. 3, another version of the invention is illustrated wherein the piece 24 supports a tandem support platform 30 which may support at least a pair of beverage containers. Recesses 31 and 32 are provided along with a grip means, such as sponge or foam material 33, in each of the respective recesses. In this version, an elongated hinge 34 is employed since a single ring would be too wobbly. A similar retaining means taking the form of opening 35 and latch 36 may be employed to that previously described with respect to the embodiment shown in FIGS. 1 and 2.

Figure 5:
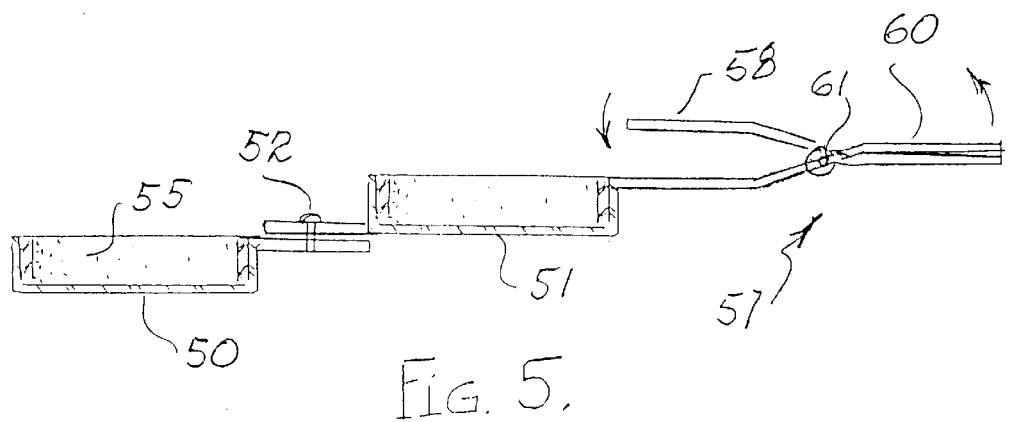
FIG. 5 is an enlarged longitudinal cross-sectional view of the embodiment shown in FIG. 4 as taken in the direction of arrows 5—5 thereof.

Referring to FIGS. 4 and 5, another embodiment of the invention is illustrated including a pair of beverage or cup holders, identified by numerals 50 and 51, which are joined together by means of a pivot 52 so that one holder may be visited with respect to the other for storage or transportation purposes. Each holder 50 and 51 includes a recess 53 and 54 respectively and each recess is lined with a gripping means, such as a foam or cushion-type material. Such a gripping means is indicated by numeral 55 with respect to the holder 50. The recess. 53 downwardly depends from the underside of the holder 50 while the recess carried on holder 51 is defined by an upwardly projecting circular wall 56. Thus, the upper surface of holder 50 and the under surface of holder 51 are flush so as to permit rotation of the holders with respect to one another so that the holder 50 may be stowed underneath the holder 51 and the entire unit can be carried in a purse or carrying case. The gripping means is intended to engage in an interference fit with the bottom of a cup or beverage can and the grip is loose enough to permit easy removal of the cup or can from the recess.

A spring clip 57 is carried on the side edge of holder 51 and includes a finger lever 58 which when depressed, causes the jaws 60 to open so that the edge of the serving tray carried on the seatback can support the double holder. Once the jaws are open, they may be fitted over any edge marginal region of the tray for support. The holders 50 and 51 are cantilevered outwardly from the edge of the tray.

Referring to FIG. 5, it can be seen that the double tray incorporates the holders 50 and 51 in a tiered relationship and that the jaws 60 may be opened by depressing lever 58. A pivot and spring arrangement 61 may cause the jaws to automatically close and stay closed until operated into an open position by depression of lever 58.

In view of the foregoing, it can be seen that the versions or embodiments of the present invention are holders which will readily support cups or beverage cans in an unright position even though the seatback of an airline seat may be moved forward or rearward. The seat occupant will have more space for body movement. Preferably, the holders can be manufactured from a suitable heat resistant plastic material or composition and such material is of a high weight-to-strength ratio so that the device is light and may be readily carried in a purse, handbag, briefcase or the like.

It is further contemplated in FIGS. 1-3, that the width of hook 16 may be adjustable to accommodate a particular width of tray edge. Adjustment means such as sliders, buttons and openings, snap-lock fasteners, hook and pile or the like may be utilized. Also, an opening can be provided on portion 15 in FIG. 1 similar to opening 35 for insertably receiving and retaining a latch member similar to latch 36 so that the device can be folded into a storage pack.

Figure 6:
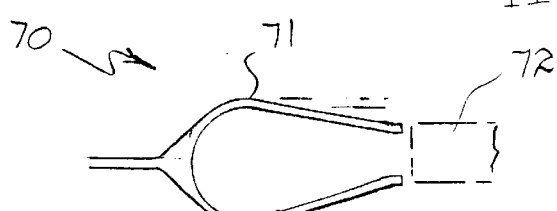
FIG. 6 is a side elevational view of an alternative clip means for detachably retaining the tray onto a supporting structure.

The embodiment shown in FIGS. 4 and 5 may replace the clamp 57 with an adjustable latch means 70 as shown in FIG. 6 for accommodating various thicknesses of seat trays to which the articulated cup tray is attached. Such a means may include a spring biasing grip 71 mounted on the tray having a restricted receptacle for mountably receiving the edge marginal region 72 of the seatback tray. The grip may include a compressible foam material in the receptacle for engaging with the seatback tray edge and the grip itself may include an adjustable latch with prongs and openings for mounting onto a variety of tray widths or thicknesses.

Figure 7:
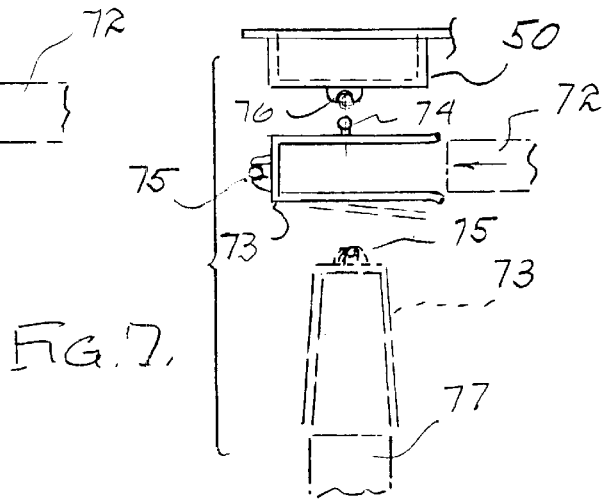
FIG. 7 is a fragmentary side elevational view of still a further alternative clip means for retaining the tray onto a supporting structure such as a conventional seat tray or onto an arm rest.

FIG. 7 illustrates an alternative clip means 73 for attaching to the underside of tray 50 by detent 74 or detent 75 snap-locking with socket 76 carried on the tray. The tray 72 edge is urged between the spring biasing sides of the clip means 73 into a seated retention position. In broken lines, the sides are urged over the thickness of a seat or chair armrest 77.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A food or beverage holder for use with a seatback tray comprising:

a stabilizing portion;

a support portion;

universal joint means operably coupling said support portion to said stabilizing portion;

at least one shallow recess in said support portion adapted to receive and retain a food or beverage container;

a mounting means carried on said stabilizing portion for supporting said stabilizing portion and said support portion from a supporting structure;

said stabilizing portion having two ends and includes a hook at one end and a ledge at another end;

said universal joint means including a hinge interconnecting said ledge with said support portion; and said support portion includes a platform with said recess.

2. The holder defined it claim 1 including:

said recess lined with a retention composition for releasably retaining said container in said recess.

3. A food or beverage holder assembly comprising:

a supporting structure having an edge marginal region;

a tray having at least one receptacle for insertably receiving a container;

a support extension integrally carried on said tray outwardly extending from said tray, mounting means carried on said support extension for detachable connection with said supporting structure;

said mounting means having a pair of spring biased clip members outwardly projecting from said support structure;

said clip members adapted to insertably receive said edge marginal region of said supporting structure therebetween;

said supporting structure is a seatback folding tray or an armrest; and snap lock means carried on said mounting means and said tray for detachably coupling said mounting means with said tray.

4. The food or beverage holder assembly defined in claim 3 wherein:

said snap lock means includes a nub detent downwardly projecting from said tray; and a pair of sockets carried on said mounting means selectively engageable with said nub detent to couple said mounting means so that a reduced entrance to said mounting means faces at right angle to said tray or parallel with said tray.

* * * * *